United States Patent [19]

Comas et al.

[11] Patent Number: 5,738,583
[45] Date of Patent: Apr. 14, 1998

[54] INTERACTIVE WIRELESS GAMING SYSTEM

[75] Inventors: Nelson R. Comas, Coral Springs, Fla.; Alan Gil, Grapevine, Tex.; Christopher L. McCarley, Boca Raton, Fla.

[73] Assignee: Motorola, Inc., Schaumburg, Ill.

[21] Appl. No.: 594,602

[22] Filed: Feb. 2, 1996

[51] Int. Cl.[6] .................................................. A63F 9/22
[52] U.S. Cl. .................................................. 463/40; 463/39
[58] Field of Search .................................. 463/40, 39, 42, 463/41, 31, 30, 43, 44; 364/410; 340/825.44, 825.26, 825.27, 825.37; 455/38.1; 379/57; 345/122; 370/281, 276

[56] References Cited

U.S. PATENT DOCUMENTS

| | | | |
|---|---|---|---|
| 4,521,014 | 6/1985 | Sitrick | 463/40 X |
| 4,951,039 | 8/1990 | Schwendeman et al. | |
| 5,048,831 | 9/1991 | Sides | 463/40 X |
| 5,618,045 | 4/1997 | Kagan et al. | 463/40 |

FOREIGN PATENT DOCUMENTS

8024440  1/1996  Japan .

*Primary Examiner*—Jessica Harrison
*Assistant Examiner*—Michael O'Neill
*Attorney, Agent, or Firm*—Philip P. Macnak

[57] ABSTRACT

An interactive wireless gaming system has a plurality of wireless gaming units which operate alternately as a host device. The wireless gaming units include a receiver for receiving wireless messages including gaming information which provides periodically update data signals generated by the gaming units to indicate a present position of a plurality of moveable objects moving. A display displays the gaming information in a form of graphic characterizations depicting the moveable objects. A processor generates the updated gaming information, and includes a memory for storing the data signals; a decoder for generating control signals in response to the gaming information received; a controller responsive to the control signals for effecting sequential storage of the data signals and a recall of a last of the data signals stored for display; and a network interface coupled between the controller and the game server. A transmitter transmits wireless responses to provide the updated gaming information.

14 Claims, 6 Drawing Sheets

INTERACTIVE WIRELESS GAMING SYSTEM

FIELD OF THE INVENTION

This invention relates to a method of transmitting and receiving gaming information and more particularly to a method which allows for gaming users to communicate either with a host system or other gaming users in an interactive and wireless fashion.

BACKGROUND OF THE INVENTION

There are currently several systems allowing gaming users to either communicate with a host system or to communicate directly with each other. Such systems include Compuserve, America Online, as well as various Bulletin Board services. One of the disadvantages of such systems is that they require standard telephone lines in order to properly operate. For example, a gaming user on one of these systems is required to dedicate a telephone line in order to participate in communications with either a host system or other gaming users. Another disadvantage to such systems is that they are not sufficiently mobile to allow gaming users flexibility in their movements and travels if they wish to retain the interactive capability. As a result, in order for two or more gaming users to directly communicate with a host system or one another, the gaming users must either be within close proximity to one another to allow for a cabled connection or, in the alternative, communicate through a telephone line.

To overcome these disadvantages, wireless communication devices have been developed such as described in U.S. Pat. No. 4,951,039, to Schwendeman et al. (the '039 patent) which discloses a portable communications receiver. Although the invention allows for receiving and detecting periodically updated information in a wireless fashion, it does not allow for interactive communication.

Thus, there is a need in the art to provide a system allowing for the communication between a gaming user and a host system or with other gaming users in an interactive fashion.

There is an additional need in the art to provide a system allowing for the communication between a gaming user and a host system or with other gaming users in a wireless fashion.

There is an additional need in the art to provide a system allowing for the communication between a gaming user with a host system or with other gaming users through a paging network using current paging technology.

SUMMARY OF THE INVENTION

The present invention solves significant problems in the art by providing an interactive wireless gaming system. Generally described, the present invention provides an interactive wireless gaming system having a plurality of wireless gaming units operating alternately as a host device and a guest device. The wireless gaming units further comprise a receiver for receiving wireless messages which includes gaming information generated by the gaming units with the gaming information having periodically updated data signals which indicate a present position of a plurality of moveable objects moving periodically as the data signals are updated. A display is provided for displaying the gaming information received in a form of graphic characterizations depicting moveable objects. A processor is included for providing updated gaming information at the gaming units. The processor includes a memory for storing the data signals, a decoder which is coupled to the receiver for generating control signals in response to the gaming information; a clock which is coupled to the decoder; a controller which is coupled to the decoder, the display, and the memory, and which is responsive to the control signals for effecting a sequential storage of the data signals, and further for effecting a recall for display of a last of the data signals stored in the memory, and a network interface which is coupled between the controller and the game server. A transmitter is provided for transmitting wireless responses to provide the updated gaming information.

DESCRIPTION OF A PREFERRED EMBODIMENT

Figure 1:
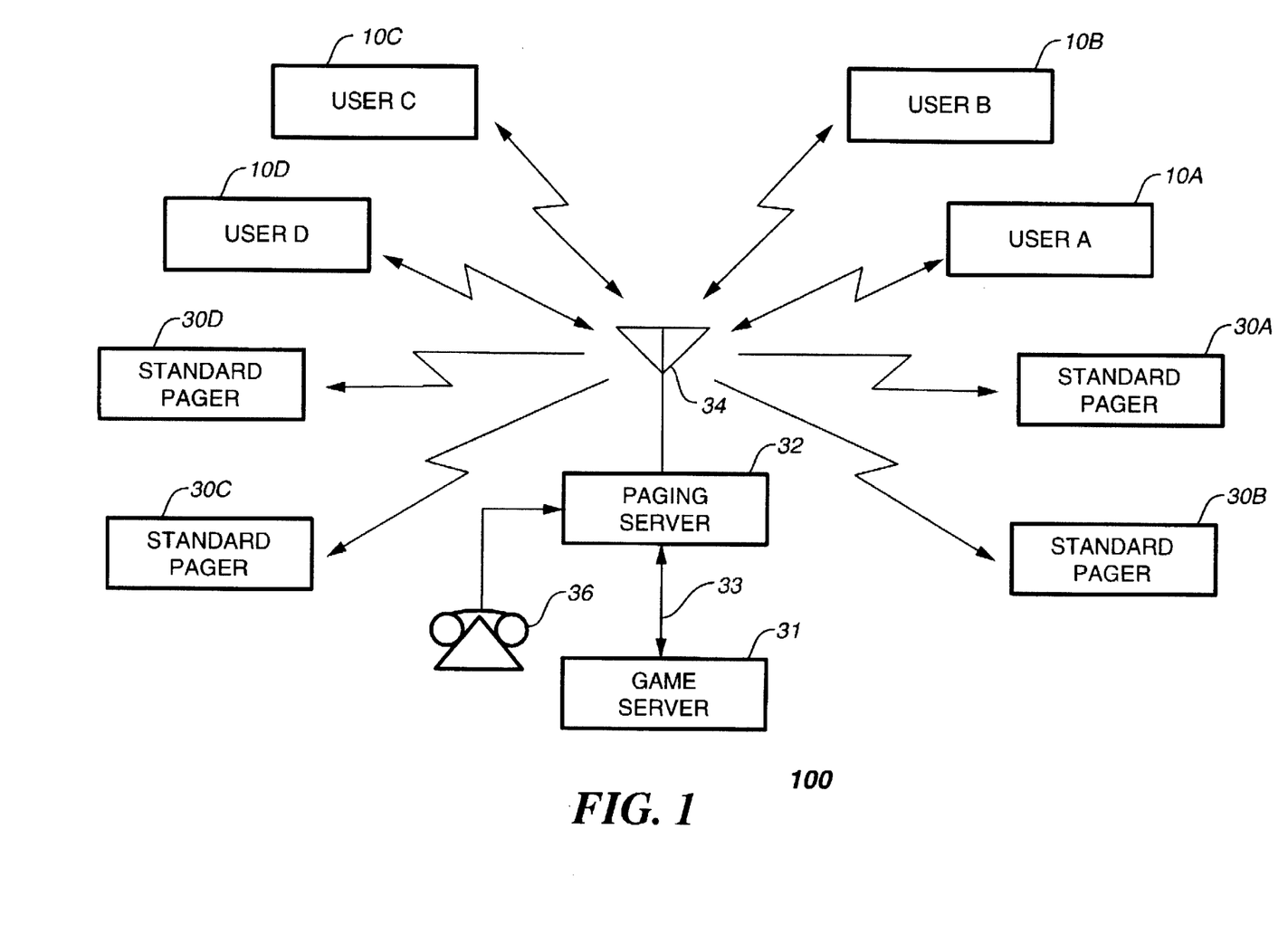
FIG. 1 is a block diagram of the interactive wireless gaming system showing the communications process operating in a typical communication system depicting the preferred embodiment according to the present invention.

Reference is directed to FIG. 1, in which like numerals indicate like elements throughout the several views, which shows a general block diagram of an interactive wireless gaming system 100 incorporating the communications process of the present invention. In a preferred embodiment of the present invention, a plurality of wireless gaming units, represented as four gaming units 10A–D are shown which receive and transmit periodically updated data signals generated by a game server 31 using, in one instance, a dedicated two-way paging system which provides a dedicated outbound frequency and a dedicated inbound frequency to provide frequency duplex operation. The frequency duplex operation allows each gaming unit 10A–D to operate alternately as a host device and as a guest device to transmit and receive data signals to and from the gaming unit 10A–D and the game server 31. It will be appreciated that in such an interactive wireless gaming system 100 as described, games played using the wireless gaming units 10A–D of the present invention can typically be played between two or more players, and can be relatively fast paced, such as action games engaging one player against another, as will be described in further detail below.

Referring also to FIG. 1, in an alternate embodiment of the present invention, a plurality of wireless gaming units, represented as four gaming units 10A–D receive and transmit periodically updated data signals generated by a game server 31 over a conventional two-way paging system which also includes conventional pagers 30A–D four of which are shown by way of example, and which can receive paging messages originated from a page origination device, such as a telephone 36, in a manner well known to one of ordinary skill in the art. While conventional one way, or receive only pagers are shown by way of example, it will also be appreciated that paging transceivers which can receive messages and which can also provide an acknowledge back response can be utilized within the interactive wireless gaming system 100 as well. It will be appreciated that due to limitations in queuing of messages for transmission in such a conventional paging system, games played using the wireless gaming units 10A–D of the present invention would typically be limited to relatively slow paced games played between two or more players, such a chess game or other game of strategy, so as to not conflict with the regular paging traffic.

In either embodiment of the present invention described above, the game server 31, through a local area network 33, communicates with the paging server 32 which controls the transmission and reception of periodically updated data signals to and from a paging base station, depicted by antenna 34. In addition, the periodically transmitted data signals, as will be described below, can include periodically updated relative position signals which are transmitted through the antenna 34 by the game server 31 via the paging server 32.

Figure 2:
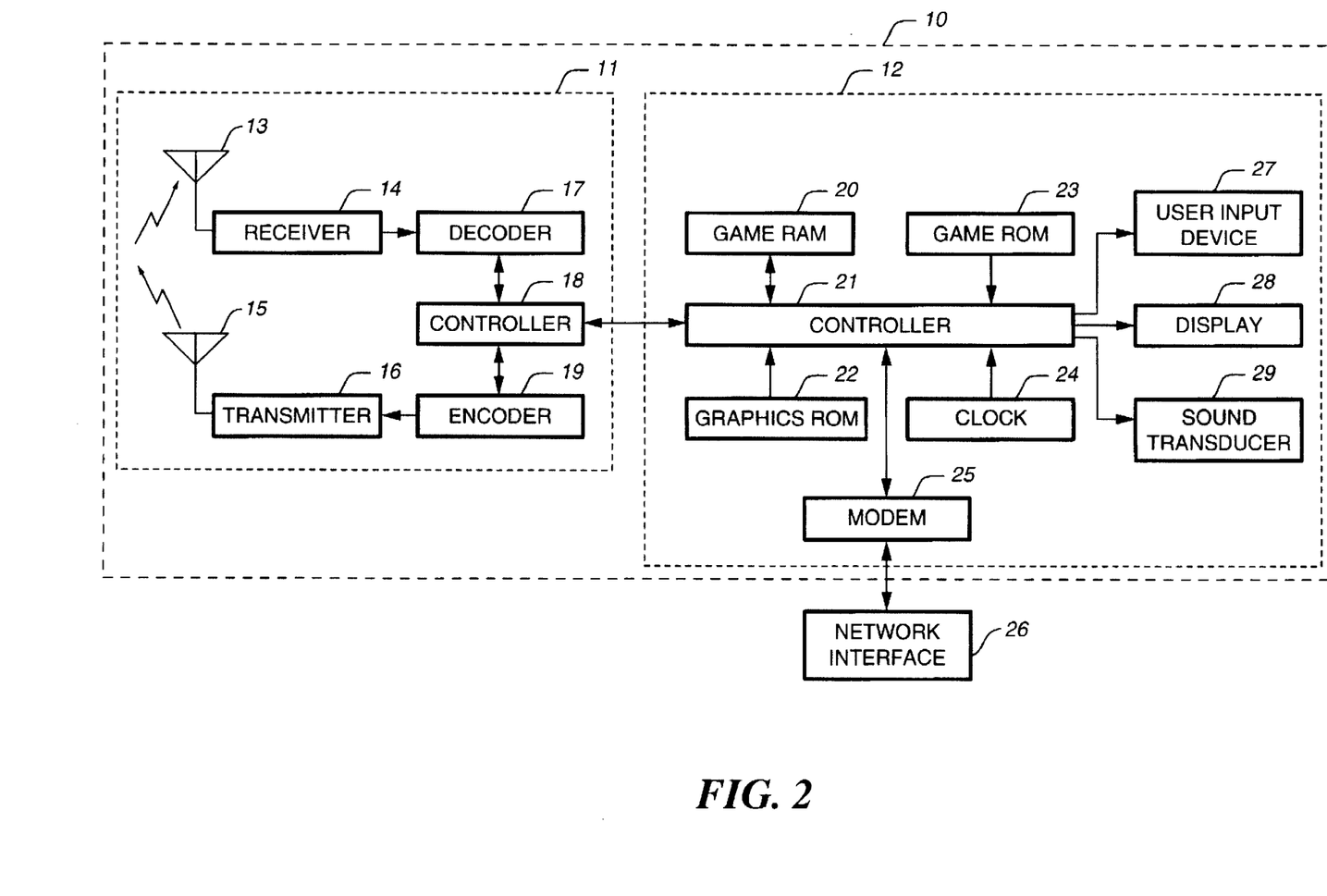
FIG. 2 is an electrical block diagram of a preferred embodiment of the interactive wireless gaming unit according to the present invention.

Referring is now directed to FIG. 2 of the drawings, a preferred embodiment of one of a plurality of interactive wireless gaming units, hereafter referred to as a wireless gaming unit 10, for use in the interactive wireless gaming system 100 of the present invention is generally illustrated by reference numerals 11 and 12 representing a paging transceiver and a wireless gaming unit processor, respectively. In particular, the paging transceiver 11 comprises a receiving antenna 13, a transmitting antenna 15, a receiver 14, a decoder 17, a transceiver controller 8, an encoder 19, and a transmitter 6. The wireless gaming unit processor 12 comprises a game random access memory (RAM) 20, a game read only memory (ROM) 23, a wireless gaming unit controller 21, a graphics ROM 22, a clock 24, a user input device 27, a display 28, a sound transducer 29, and optionally a modem 25.

In the preferred embodiment, the receiving antenna 13 is coupled to the receiver 14 for receiving and detecting transmitted selective call paging signals and periodically updated data signals. A serial stream of data is provided at the output of receiver 14 corresponding to the selective call paging signals and the periodically updated data signals received. The selective call paging signals are coupled to a decoder 17 which is implemented using a microprocessor in a manner well known to one of ordinary skill in the art. The decoder 17 communicates with a transceiver controller 18 which is responsive to a plurality of control signals generated by the decoder 17. The paging transceiver controller 18 communicates with an encoder 19 and a transmitter 16 along with the transmitting antenna 15 to allow for the dissemination of a plurality of control signals. While a separate receiving antenna 13 and transmitting antenna 15 are shown in FIG. 1, it will be appreciated that a single receiving/transmitting antenna suitably coupled to the receiver 14 and to the transmitter 16 can be utilized to receive and transmit the periodically updated data signals as well.

Turning now to the wireless gaming unit processor 12, gaming information received is sequentially stored as periodically updated data signals in a memory 20 represented by a game RAM under the control of a wireless gaming unit controller 21 which is responsive to the plurality of control signals generated by decoder 17. The wireless gaming unit controller 21 comprises of a standard industry microprocessor. Information, including graphic characterizations, which has been selected for display from game RAM 20 is exhibited through a display 28, such as an LCD display, under the control of the wireless gaming unit controller 21. The graphic characterizations which are displayed can be individually animated during the time interval between the periodic updates of the data signals, adding further to the realism of the game as will be further described below. The data signals include relative position signals which provide a relative position of the graphic characterizations which represent a plurality of moveable objects when displayed. The relative position signals represent a plurality of incremental positions of the moveable objects on the display. Information stored in game RAM 20 may be accessed through a user input device 27.

Game ROM 23 contains all the firmware routines and instructions required by the wireless gaming unit controller 21 which is necessary to store and to display the received information. Game ROM 23 also contains all of the menus required to select the readout of stored information as well as graphic representations of the plurality of moveable objects which are provided in conjunction with a graphics ROM 22.

The wireless gaming unit 10 of the present invention, in addition can have means for coupling to a telephone network for receiving and communicating additional information directly to a central location, such as a game server. This is accomplished through a modem 25 and a network interface 26. Verbal communications are further possible through the use of a sound transducer 29.

Figure 3:
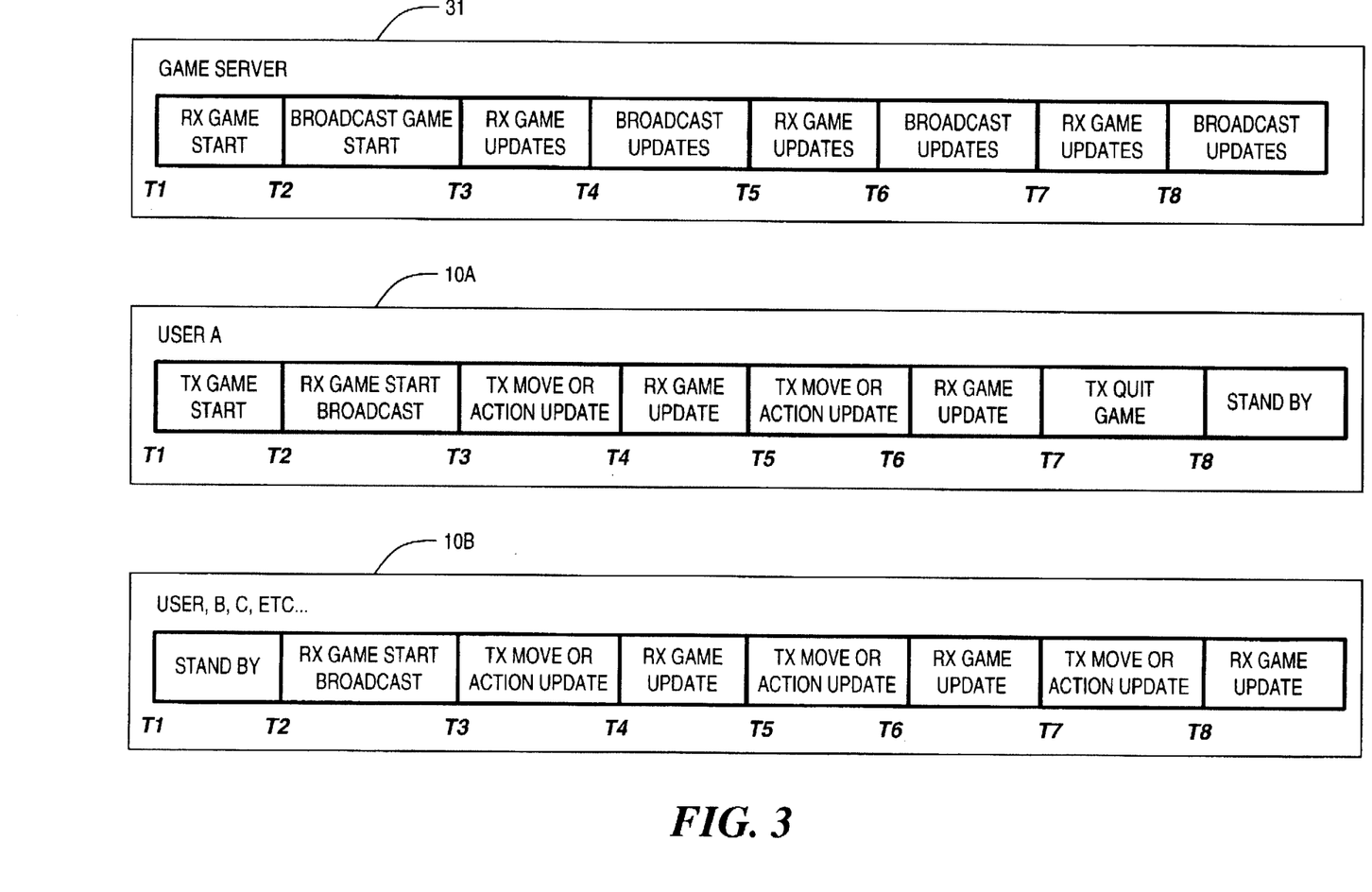
FIG. 3 is a timing diagram of the interactive wireless gaming system showing typical system signaling strategies in the preferred embodiment of the present invention.

Reference is next directed to FIG. 3 which shows a timing diagram depicting typical system signaling strategies for transmitting and receiving wireless messages which include gaming information generated by the gaming units 10 in accordance with the preferred embodiment of the present invention. A gaming session is initiated at time T1 which begins with the game server 31 receiving a control signal transmitted by User A 10A. User B 10B remains on a standby mode during this period. At time T2, the game server 31 transmits a game start signal which is received by User A and User B, 10A and 10B respectively, as a "Start Broadcast" signal. Also at the time T2, a paging signal may be sent to User B 10B to act to provide an alert signaling the initiation of a gaming session. The alert can be audible, visual, or audible and visual. At time T3, Users A and B, 10A and 10B respectively, transmit a data signal signifying a movement in a graphic characterization or another action update while the game server 31 receives the data signals. At time T4, the game server 31 transmits updated data signals which are received by Users A and B, 10A and 10B respectively. This process continues throughout time T5 and T6 until time T7 is reached at which the game server 31 receives a control signal signifying the end of the gaming session from User A 10A. User B 10 B continues to transmit either a movement in a graphic characterization or another action update at time T7. At time T8, the game server 31 transmits a final update received by User B 10B while User A 10A remains in a standby mode in preparation for another gaming session. It will be appreciated that FIG. 3 is exemplary of a typical gaming session which may progress over a period of minutes to hours.

Figure 4:
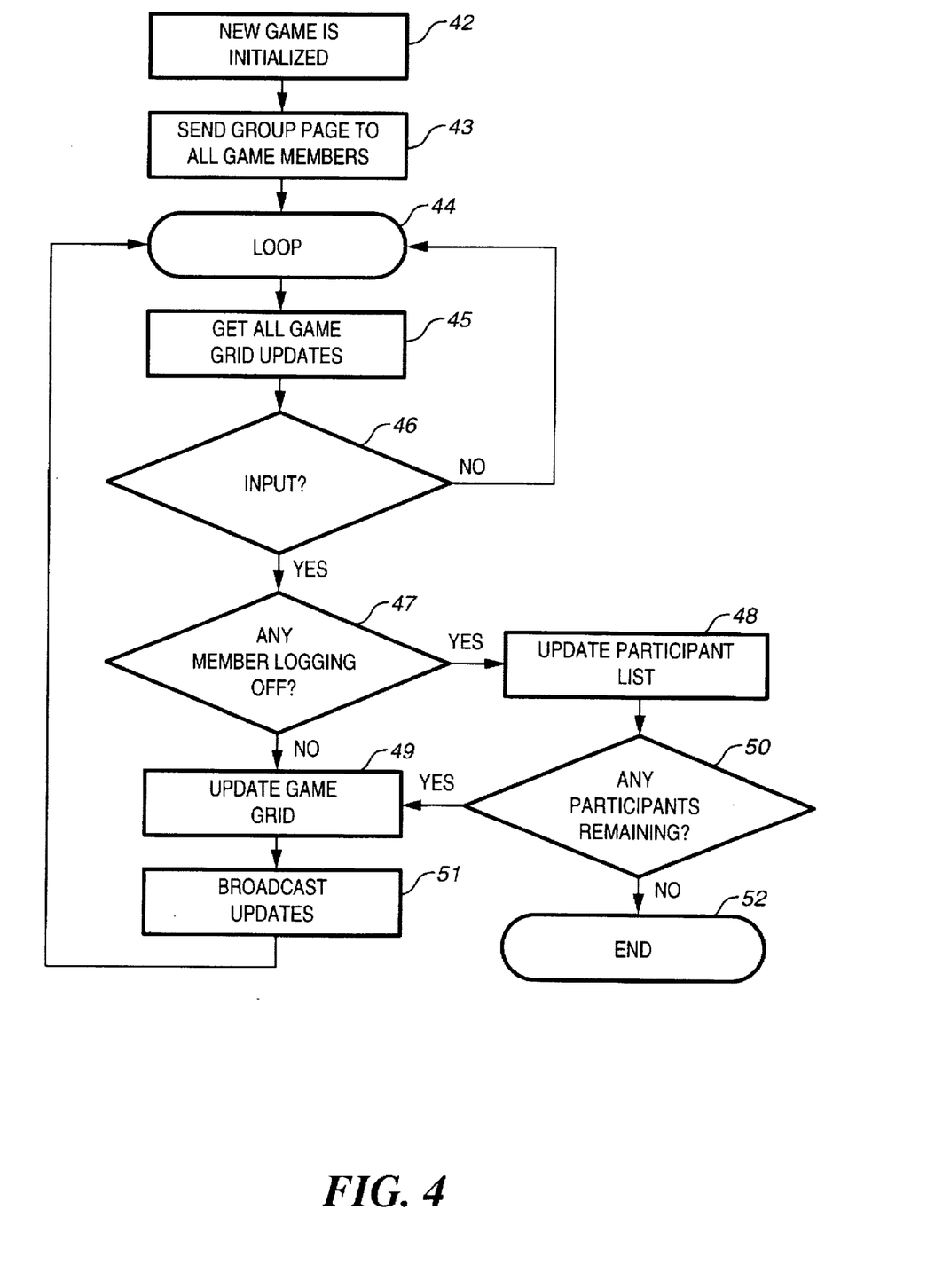
FIG. 4 is a flowchart of the interactive wireless gaming system showing the host operation in the preferred embodiment according to the present invention.

Turning now to FIG. 4, a flowchart showing the operation of a host device in the preferred embodiment of the present invention is depicted. As data is processed by the game server 31, a new gaming session is initialized as shown in block 42. A number of gaming users can be selected by the gaming user and a page is sent via the game server 31 to other gaming members to alert them as to the starting time as well as ending time of a particular gaming session as shown in block 43. A looping sequence is next entered at block 44 whereupon the gaming users provide updates to all information regarding the current game, such as graphic characterizations and other gaming information in block 45, after which at the appropriate time the information is broadcast. When the input signal at block 46 is not received by the game server 31 from the gaming units, the looping sequence 44 begins anew. When the input signal at block 46 is received from the gaming units, the information received is checked as to whether the gaming user responding is logging on, logging off, or updating information at block 47. When the gaming user is logging off at block 47, a member participant list is updated at block 48 from the information received in block 47, and then checked as to whether any gaming users remain at block 50, at which point, if no other gaming users remain, the gaming session is terminated as shown in block 52. If gaming users remain, or when new gaming users log on at block 47, the game grid including graphic characterizations as well as other information provided by the gaming users is updated at block 49, and the updates are broadcast by the game server 31 at block 51, and the looping sequence of block 44 begins again.

Figure 5:
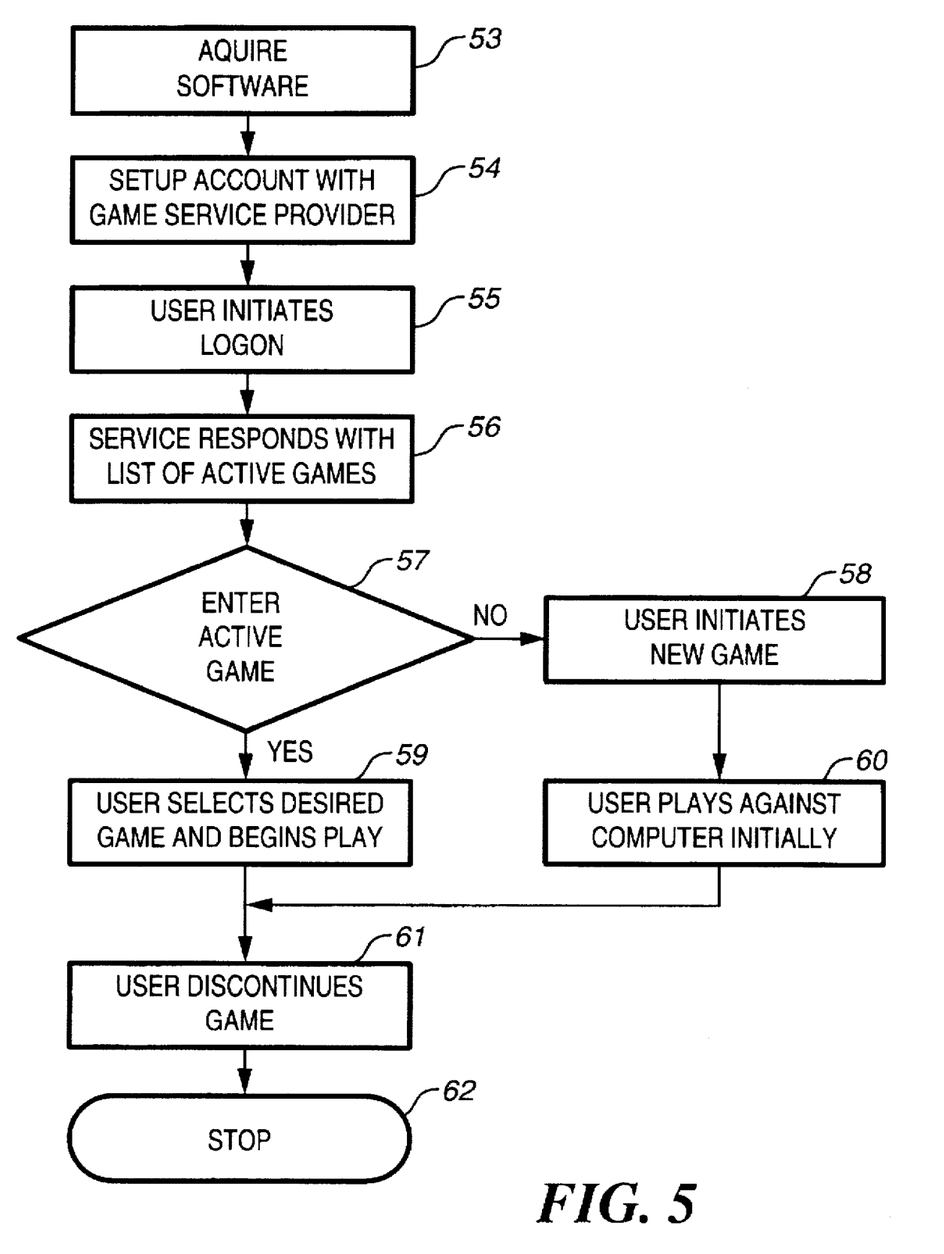
FIG. 5 is a flowchart of the interactive wireless gaming system showing distributive interactive gaming in the preferred embodiment according to the present invention.

Turning next to FIG. 5, a basic system flow diagram is shown for the preferred embodiment of the present invention. Software is first acquired from any number of sources which are apparent to those skilled in the art as shown in block 53. An active account is next created with a game service provider such as America On-Line or Compuserve as shown in block 54. Once the account is created, the gaming user initiates a standard logon procedure at block 55 at which time the game server 31 responds with a current list of active gaming sessions ready to begin or already in progress as shown in block 56. The gaming user is then given a choice whether to enter an active gaming session at block 57 or initiate a new gaming session at block 58. When the gaming user initiates a new game, the gaming user may initially play against a computer at step 60 if no other gaming users are available. When the gaming user enters an active gaming session at block 57, a decision is made as to which gaming session to enter and the session is initiated at block 59. At the end of the gaming session or at any time earlier, the user may discontinue the gaming session at block 61 and the session is ended as shown in block 62.

Figure 6:
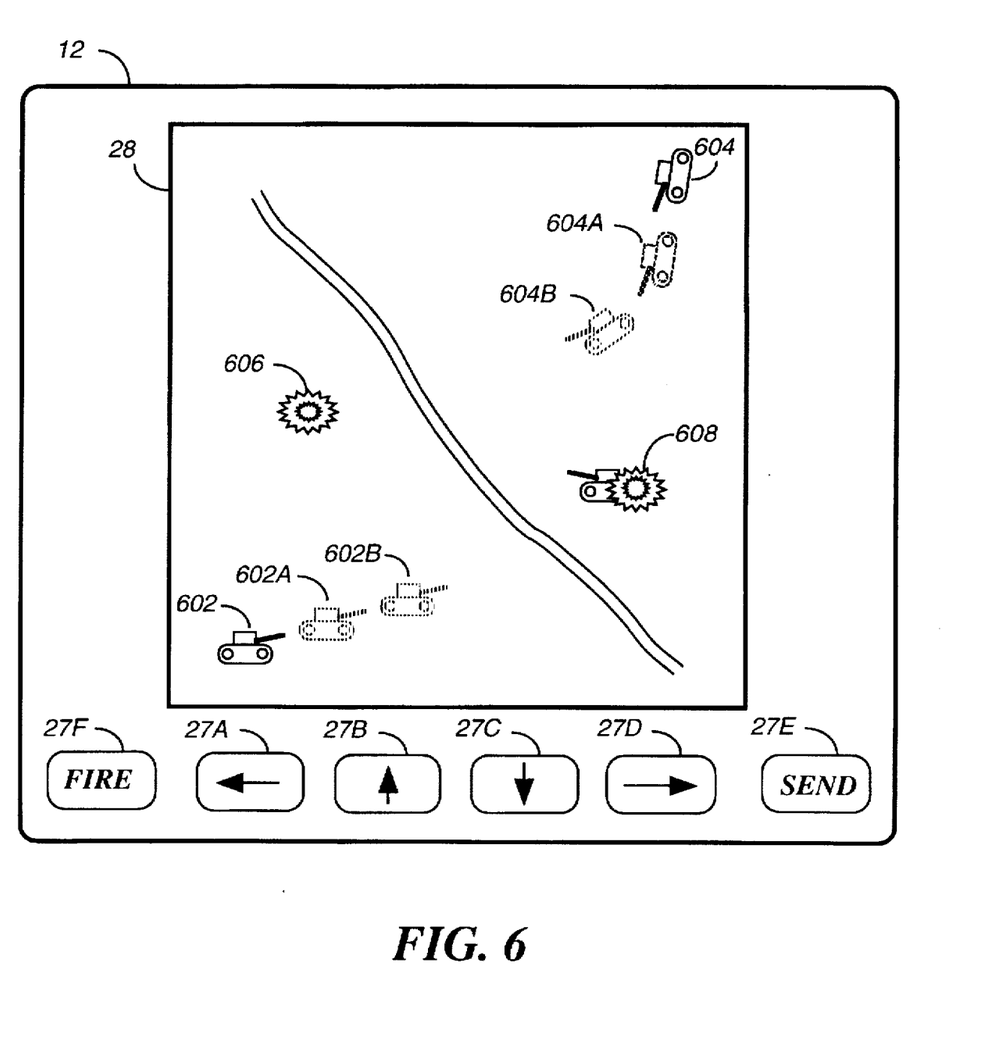
FIG. 6 is a graphic illustration showing a typical animation sequence in the preferred embodiment according to the present invention.

Reference is next directed to FIG. 6 which shows a typical animation sequence within a wireless gaming session, and which by way of example shows a graphic characterization of a tank battle as provided by the preferred embodiment of the present invention. A gaming unit 10 having a display 28 and user input devices 27A through 27F is generally shown. Present positions of movable objects 602 and 604 are depicted as graphic characterizations of battle-tanks displayed at a given instance of time on the display 28. Relative positions 602A, 602B, 604A, and 604B, representing a change in position of the movable objects 602 and 604, relative to a prior position or relative to the position of another movable object, and are encoded through the process described in FIG. 2 to provide relative position signals for transmission. The relative position signals represent a plurality of incremental positions of the moveable objects 602 and 604 on the display 28. Further, individually animated graphic characterizations can be provided, such as graphic characterization 606 and 608 which depict, for example, growing from small to large and representing an actual event, an explosion of an artillery shell.

In summary, an interactive wireless gaming system has been described above which includes a plurality of wireless gaming units operating alternately as a host device and a guest device over a communication system, such as provided by a dedicated two-way paging system or a conventional two-way paging system. The wireless gaming units include a receiver for receiving wireless messages including gaming information generated by a wireless gaming server or another wireless gaming unit, the gaming information including data signals which are periodically updated and which indicate a present position of a plurality of moveable objects moving periodically as the data signals are updated. The wireless gaming units have a display for displaying the gaming information received in a form of graphic characterizations depicting moveable objects, a processor for providing updated gaming information at the gaming units, and a transmitter for transmitting wireless responses to the wireless gaming server or to another wireless gaming unit to provide the updated gaming information.

What is claimed is:

1. An interactive wireless gaming system comprising:
    a plurality of wireless gaming units operating alternately as a host device and a guest device, wherein said gaming units further comprise:
    a receiver for receiving wireless messages including gaming information generated by said gaming units, the gaming information comprising data signals which are periodically updated, the data signals indicating a present position of a plurality of moveable objects moving periodically as the data signals are updated;
    a display for displaying the gaming information received in a form of graphic characterizations depicting moveable objects;
    a processor for providing updated gaming information at the gaming units, said processor comprising
      a memory for storing the data signals,
      a decoder coupled to said receiver for generating control signals in response to the gaming information,
      a clock coupled to said decoder,
      a controller coupled to said decoder, said display, and said memory and responsive to the control signals for effecting a sequential storage of the data signals, and further for effecting a recall for display of a last of the data signals stored in said memory, and
      a network interface coupled between said controller and said game server; and
    a transmitter for transmitting wireless responses to provide the updated gaming information.

2. The interactive wireless gaming system of claim 1 further comprising a game server comprising:
    a receiver for receiving the updated gaming information generated by the gaming units; and
    a transmitter for re-transmitting the updated gaming information to the gaming units.

3. The interactive wireless gaming system of claim 2, wherein said gaming units and said game server operate using a dedicated outbound frequency and a dedicated inbound frequency to form a multiple frequency duplex allowing each gaming unit to transmit and receive signals on separate frequencies.

4. The interactive wireless gaming system of claim 1, wherein said graphic characterizations are displayed and individually animated through said display of said gaming units during a time interval between periodic updates of the data signals.

5. The interactive wireless gaming system of claim 1, wherein the data signals include relative position signals to provide a relative position of the plurality of moveable objects, and wherein said processor is responsive to the relative position signals for generating the graphic characterizations corresponding to each of the relative position signals.

6. The interactive wireless gaming system of claim 1, wherein said display comprises:

a graphic display for displaying the data signals stored in said memory; and a display driver, coupled to said graphic display and to said controller, for driving said graphic display in response to said controller providing the data signals which are stored in said memory.

7. The interactive wireless gaming system of claim 1, further comprising an alerting device, responsive to the control signals, for generating an alert in response to certain signals informing gaming users of specific gaming events including, but not limited to, a starting time and an ending time of a particular gaming session.

8. The interactive wireless gaming system of claim 7, wherein the alerting device is at least one of audible, visual and both audible and visual.

9. The interactive wireless gaming system of claim 2, wherein one or more gaming units can communicate interactively with said game server.

10. The interactive wireless gaming system of claim 9, wherein two or more gaming units can communicate interactively with one another.

11. The interactive wireless gaming system of claim 2, wherein information is passed from said gaming units to said game server through a paging transceiver.

12. The interactive wireless gaming system of claim 11, wherein gaming users are alerted to a particular gaming session through said paging transceiver for receiving and detecting transmitted selective call paging signals and the data signals which are periodically updated.

13. The interactive wireless gaming system of claim 1, wherein gaming information is secured through an authentication process including gaming user identification.

14. The interactive wireless gaming system of claim 1, wherein gaming information is periodically preserved in said memory to prevent a loss of the gaming information.

* * * * *